UNITED STATES PATENT OFFICE.

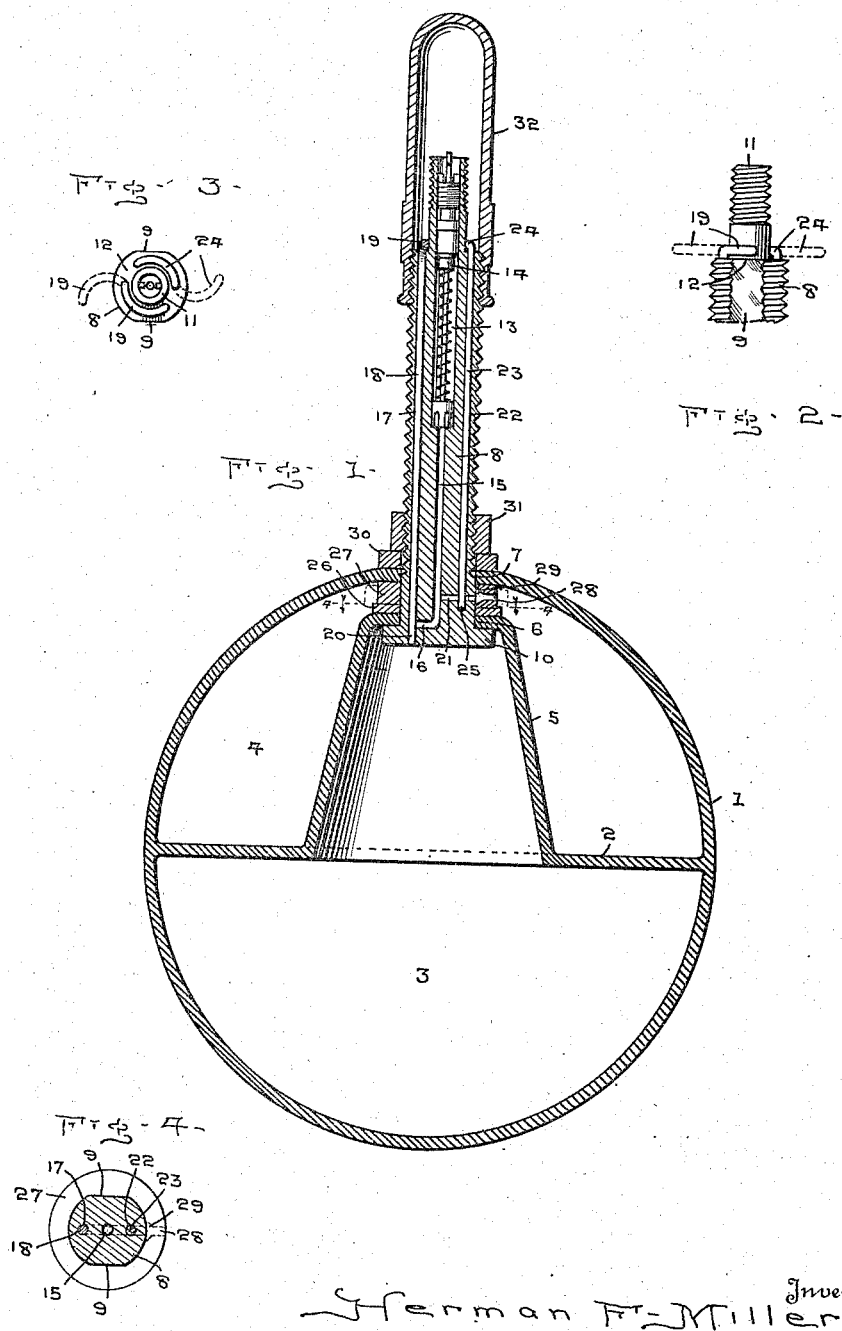

HERMAN F. MILLER, OF RUSHVILLE, NEBRASKA.

VALVE FOR PNEUMATIC TIRES.

1,226,563.  Specification of Letters Patent.  Patented May 15, 1917.

Application filed May 3, 1916. Serial No. 95,170.

*To all whom it may concern:*

Be it known that I, HERMAN F. MILLER, a citizen of the United States, residing at Rushville, in the county of Sheridan and State of Nebraska, have invented certain new and useful Improvements in Valves for Pneumatic Tires; and I do hereby declare the following to be a full, clear, and exact description of the invention, such as will enable others skilled in the art to which it appertains to make and use the same.

My invention relates to valves for pneumatic tires, and more particularly to a valve for use in connection with a multi-chambered tire.

Another object of my invention is the provision of a valve provided with means for the introduction of air into either or any of the chambers of a multi-chambered tire as desired.

A further object of this invention is the provision of a valve for use in conjunction with a multi-chambered tire provided with means for insuring the positive introduction of air into the respective chambers of the tire.

A still further object of this invention is the provision of a valve for use in conjunction with a multi-chambered pneumatic tire, which is simple in construction, efficient and durable, and which can be manufactured and sold upon the market at a nominal cost.

These and other objects will more fully appear as the nature of the invention is more clearly understood from the following specification, the subject matter of the claim, and the views illustrated in the accompanying drawings, in which, Figure 1 is a vertical transverse sectional view through the valve and the tire showing the manner of mounting the valve upon the tire and the detail construction of the valve and tire.

Fig. 2 is a side elevation of the upper portion of the valve tube and the nipple thereon, showing the operating handles of the valve rods turned inwardly in full lines, the dotted lines showing the position of the same when turned outwardly.

Fig. 3 is a top view of the structure shown in Fig. 2.

Fig. 4 is a horizontal sectional view through the valve tube, on line 4—4 of Fig. 1 looking in the direction of the arrows, showing certain of the detail construction of the valve tube with one of the washers thereon.

Referring to the drawings, 1 denotes the inner tube of a pneumatic tire, having formed therein the partition wall 2, which extends centrally around the circumferential direction of the tire and extends from wall to wall along the horizontal diameter of the inner tube 1. The partition wall 2 divides the inner tube 1 into the lower compartment 3 and the upper compartment 4, and projecting upwardly at a suitable point from the partition wall 2 into the compartment 4 is the extension 5. The extension 5 is hollow and is provided in its upper end with the opening 6, while its lower end opens into the compartment 3 of the inner tube 1 and establishes communication between the compartment 3 and the interior of the hollow extension 5. Formed in the upper surface of the tube 1 is the opening 7 which is directly over and in registration with the opening 6 of the hollow extension 5 of the partition wall 2.

Positioned within the opening 6 of the extension 5 and the opening 7 of the inner tube 1 is the valve tube 8, screw threaded for its entire length with the exception of its lowermost portion and provided with the oppositely disposed flattened sides 9, which flattened sides 9 extend the entire length of the valve tube 8, terminating at the head 10 formed upon the lower end of the valve stem 8, the head 10 being positioned within and engaging the under surfaces of the upper end of the extension 5. Upon the upper end of the valve stem 8 is the threaded nipple 11 to which is attached the hose of an air pump in the usual manner. Upon the upper end of the valve tube 8 and surrounding the base of the nipple 11 is the annular shoulder 12.

Formed centrally within the nipple 11 and for a distance within the upper portion of the valve 8 is the bore 13, within which is the usual air valve 14 and its mountings, and extending from the lower end of the bore 13 is the vertical port 15 communicating with the transverse port 16, the transverse port 16 communicating with the vertical bore 17 which extends entirely through one side of the valve tube 8 from its head 10 to its annular shoulder 12, and rotatably and slidably mounted within the bore 17 is the rod 18 provided at its upper end with the operating handle 19, the lower end of the rod 18 providing a valve or cut-off 20 for the transverse port 16. Formed in the lower portion of the valve stem 8 and establishing communication between the vertical port 15 and the exterior of the valve tube 8 is the transverse port 21 extending in the opposite direction to that of the transverse port 16. Formed in the opposite side portion of the valve stem 8, opposite to that through which the bore 17 is formed, is formed the bore 22 extending from the annular shoulder 12 of the valve tube 8 down to and for a distance beyond the transverse port 21 and with which transverse port 21 the bore 22 communicates. Rotatably and slidably mounted in the bore 22 is the rod 23 provided upon its upper end with the operating handle 24, and its lower end providing the valve or cut-off 25 for the transverse port 21.

For securing the valve stem in operative position, the nonrotatable washer 26 is provided, and between the washer 26 and the head 10 of the valve stem 8 is the portion of the extension 5 which surrounds the opening 6 therein. Upon the washer 26 is another nonrotatable washer 27. This nonrotatable washer 27 is provided with the radial port 28 provided with the cone-shaped or flared inlet opening 29 which communicates with the outer end of the transverse port 21 of the valve stem 8, the radial port 28 of the washer 27 communicates with the upper compartment 4 of the inner tube 1. Upon the upper surface of the washer 27 rests the portion of the inner tube 1 which surrounds the opening 7 therein, and upon the portions surrounding the opening 7 in the tube 1 is the nut 30, so that the portion of the tube 1 surrounding the opening 7 is interposed between the washer 27 and nut 30, therefore when the nut 30 is secured downwardly upon the threads of the valve stem 8 the portion surrounding the opening 6 of the extension 5 is secured between the head 10 of the valve stem 8 and the washer 26, and the portion around the opening 7 of the tube 1 is secured between the washer 27 and the nut 30, and for preventing the nut 30 against backward rotation the lock nut 31 is screwed downwardly upon the upper surface of the nut 30 for locking the same.

Screw threaded upon the upper end of the valve tube 8 is the cap 32.

The purpose of my invention is to provide an inner tube having compartments therein, and a valve for inflating the compartments of the tube at will, so that, when one of the compartments has been punctured the other may be inflated so as to prevent the loss and use of the tire. This I accomplish through the medium of the specifically constructed valve which I use in conjunction with the inner tube. To initially inflate the inner tube 1, the cap is removed from the valve stem 8 and the hose of an air pump connected to the nipple 11, the handle 19 of the rod 18 is then swung outwardly and the rod 18 elevated sufficiently to raise the cut-off end 20 thereof to uncover the port 16, so that the air from the pump will be forced past the valve 14 through the port 15, the port 16 into the lower end of the bore 17 into the extension 5 and thence into the compartment 3 of the inner tube 1, and when the compartment 3 of the inner tube 1 has been sufficiently inflated the parts are returned to their normal position and the pump removed. However, should the compartment 3 of the inner tube 1 become punctured and render the tire useless this obstacle is readly overcome by connecting the pump to the nipple 11 swinging the handle 24 of the rod 23 outwardly and then elevating the rod 23 sufficiently for raising its cut-off 25 for uncovering the port 21, the air being then free to pass from the pump past the valve 14 through the port 15, the port 21, and the port 28 of the washer 27 into the compartment 4 of the inner tube and when the compartment 4 of the inner tube is sufficiently inflated these parts are returned to their normal position and the tire is thereby restored to its former usefulness.

It will also be seen that by the provision of the washer 27 formed with the port 28 and the flared or cone-shaped inlet end 29 that there can be a relative degree of vertical movement between the washer 27 and the valve stem 8 without destroying communication between the port 21 of the valve tube 8 and the radial port 28 of the washer 27, which movement might be occasioned by the different degrees of thicknesses of the rubber forming the inner tube 1 and the extension 5 of its partition wall 2, or by the compression of the parts of the inner tube which are clamped between the head 10 of the valve stem 8, the nut 30 and the washers 26 and 27 interposed therebetween, thus providing means for insuring the passage of the air from the port 21 through the port 28 into the compartment 4 of the inner tube 1.

While I have herein shown the preferred embodiment of my invention I desire it to be understood that minor alterations and variations may be made therein which may be deemed expedient, and which will neither depart from the spirit of the invention nor the scope of the claim.

Having described my invention, what I claim as new and desire to secure by Letters Patent, is:—

The combination with a multi-chambered pneumatic tire tube, of a valve comprising a valve stem having an upper reduced end to provide an annular shoulder, said stem formed centrally with a bore extending downwardly to a point adjacent the bottom thereof, said valve stem being further provided with bores in its opposite sides, one of said bores extending from the annular shoulder entirely through said stem and the other bore extending downwardly from the annular shoulder to a point adjacent the lower end of the valve stem, said valve stem being further formed with laterally extending ports, one of said ports connecting one of the side bores with the central bore, and the other port connecting the central bore, and the other side bore with the exterior of said stem, and a longitudinally movable valve rod disposed in each of said side bores and provided with a laterally extending and accurately curved handle, whereby said laterally extending ports may be opened or closed at will, said handle adapted to normally rest on the valve stem shoulder and snugly fit around said upper reduced end.

In testimony whereof I have signed my name to this specification in the presence of two subscribing witnesses.

HERMAN F. MILLER.

Witnesses:
A. C. PLANTZ,
MARTHA E. GRUBB.

Copies of this patent may be obtained for five cents each, by addressing the "Commissioner of Patents, Washington, D. C."